UNITED STATES PATENT OFFICE.

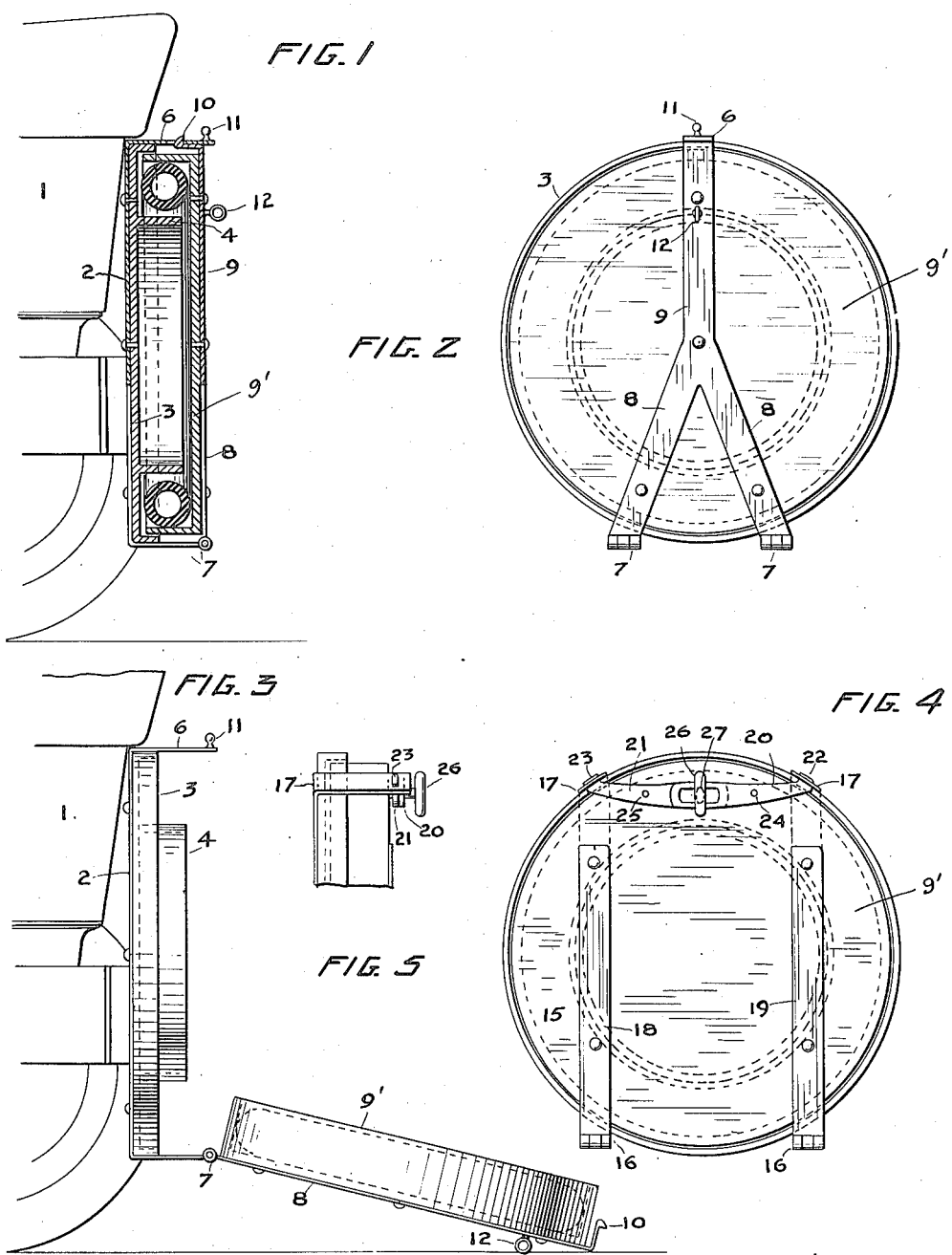

WALTER S. HEATH, OF SAN MATEO, CALIFORNIA.

TIRE-CASE.

1,153,305.

Specification of Letters Patent.　Patented Sept. 14, 1915.

Application filed June 15, 1914.　Serial No. 845.105.

*To all whom it may concern:*

Be it known that I, WALTER S. HEATH, a citizen of the United States, residing at San Mateo, in the county of San Mateo, State of California, have invented a new and useful Tire-Case, of which the following is a specification in such full and clear terms as will enable those skilled in the art to construct and use the same.

This invention relates to a tire case for the rubber tires used on automobiles and its object is to provide a device which will enable the driver to more easily secure his tires in the case than is ordinarily possible.

An embodiment of the invention is shown in the drawings in which the same reference numeral is applied to the same portion throughout the several views, but I am aware that there are many modifications thereof.

Figure 1 illustrates the back of an automobile having this case applied thereto, the case being shown in vertical section for purposes of illustration. Fig. 2 is a side elevation of the complete case. Fig. 3 is a side elevation of the car showing the case as it appears when opened. Fig. 4 is a side elevation of a slightly modified form of supporting irons for the case, and Fig. 5 is a side elevation of the locking device shown in Fig. 4.

The numeral 1 indicates the car body to which the iron 2 forming the support for the back of the casing 3 is secured. This casing has an interior case 4 to provide a space for tools, etc. The iron 2 extends horizontally at the top to form a latch 6 and horizontally at the bottom to form a hinge 7.

The lower portion of the irons holding the tire case is in the form of an A shaped frame as indicated in Fig. 2, there being two of the hinges 7. Extending from the two hinges 7 there is another A shaped frame 8 which connects with the upwardly extending plate 9 having the hook 10 to coöperate with the detent in the member 6. In order to lift the member 6 off the hook 10 a knob 11 is provided and the ring 12 is provided on the front of the plate 9 to make it convenient to pull said plate and the attached case 9′ forwardly into the position shown in Fig. 3.

In Fig. 4 the case is indicated at 15, which case has two bars with hinges 16 and overhanging arms 17 spaced at a distance from each other. The front of the case is provided with two similar bars 18 and 19, which bars serve as hinges for the support of the tire case when it is to be opened. The upper portion of the tire case has two pivoted latches 20 and 21, the hooks 22 and 23 thereon extending through openings in the overhanging arms 17. The bars 20 and 21 are pivoted to the casing at 24 and 25 and are moved by means of a suitable handle 26 which has a cam 27 bearing upon a slot in each of the latches 20 and 21.

Having thus described my invention what I claim as new and desire to secure by Letters Patent of the United States, is as follows, modifications within the scope of the claim being expressly reserved:

A tire receptacle for automobiles comprising a frame to be secured to an automobile, a half casing secured to said frame, a second frame pivoted to the first frame at a distance from the first casing, a second half casing carried by the second frame and having its closed side in the same plane as the pivot point of the frame, and a lock for securing the two casings together.

In testimony whereof I have hereunto set my hand this 5th day of June, A. D. 1914, in the presence of the two subscribed witnesses.

WALTER S. HEATH.

Witnesses:
　C. P. GRIFFIN,
　L. H. ANDERSON.